United States Patent [19]

Mavrocostas

[11] Patent Number: 4,576,002

[45] Date of Patent: Mar. 18, 1986

[54] EXHAUST MIXER FOR TURBOFAN AEROENGINE

[75] Inventor: George Mavrocostas, Lanarca, Cyprus

[73] Assignee: Rolls-Royce Limited, London, England

[21] Appl. No.: 643,183

[22] Filed: Aug. 22, 1984

[30] Foreign Application Priority Data

Sep. 14, 1983 [GB] United Kingdom ................. 8324669

[51] Int. Cl.⁴ .............................................. F02K 3/02
[52] U.S. Cl. ........................................ 60/262; 60/263; 60/264; 60/271; 181/220; 239/265.17
[58] Field of Search ................. 60/262, 263, 264, 271; 181/220, 222, 213; 239/265.17, 265.19, 265.13, 127.3

[56] References Cited

U.S. PATENT DOCUMENTS

| | | |
|---|---|---|
| 3,153,319 | 10/1964 | Young et al. .................... 239/265.19 |
| 3,664,455 | 5/1972 | Duvvuri ......................... 181/33 HC |
| 4,117,671 | 10/1978 | Neal et al. ............................. 60/262 |
| 4,175,640 | 11/1979 | Birch et al. ............................ 60/262 |
| 4,217,756 | 8/1980 | Laskody ................................ 60/262 |
| 4,227,370 | 10/1980 | Kirker ................................... 60/262 |
| 4,302,934 | 12/1981 | Wynosky et al. ...................... 60/262 |
| 4,401,269 | 8/1983 | Eiler ..................................... 60/262 |
| 4,487,017 | 12/1984 | Rodgers ................................ 60/262 |

FOREIGN PATENT DOCUMENTS

| | | |
|---|---|---|
| 849448 | 9/1960 | United Kingdom . |
| 882792 | 11/1961 | United Kingdom . |
| 881974 | 11/1961 | United Kingdom . |
| 895922 | 5/1962 | United Kingdom . |
| 895872 | 5/1962 | United Kingdom . |
| 918018 | 2/1963 | United Kingdom . |
| 1535598 | 12/1978 | United Kingdom . |
| 1540555 | 2/1979 | United Kingdom . |
| 2007303A | 5/1979 | United Kingdom . |
| 2015086A | 9/1979 | United Kingdom . |
| 2082259A | 3/1982 | United Kingdom . |

*Primary Examiner*—Carlton R. Croyle
*Assistant Examiner*—Jeffrey A. Simenauer
*Attorney, Agent, or Firm*—Cushman, Darby & Cushman

[57] ABSTRACT

The exhaust mixer can be classified as being of the multi-lobed type, with troughs between the lobes. The lobes and troughs comprise confronting pairs of flow surfaces which are twisted between their upstream and downstream ends such that a vortex flow system is established downstream of the mixer to encourage mixing between the bypass airstream and the turbine exhaust stream. The downstream edges of the twisted flow surfaces are in the form of sinuous curves which destabilize the vortex system and cause the vortices to burst, hence increasing the mixing efficiency.

8 Claims, 4 Drawing Figures

EXHAUST MIXER FOR TURBOFAN AEROENGINE

The present invention relates to exhaust flow mixers for bypass gas turbine (turbofan) aeroengines in which the turbine exhaust gases and the bypass air are combined with each other before exit from a propulsion nozzle. For convenience, the invention can be classified as a multi-lobed type of mixer.

It is known to mix the turbine exhaust stream with the air from the bypass stream using the multi-lobed type of exhaust mixer in a so-called "mixed flow" type of turbofan propulsor. Such mixers improve the propulsion efficiency of this type of aeroengine by projecting portions of the two streams into each other and increasing the area of contact between them, resulting in a transfer of thermal energy from the hot turbine exhaust stream to the cooler bypass stream. 100% mixing efficiency would result in a uniform temperature for the combined streams at the propulsion nozzle, the mixing process having been allowed to proceed to completion in a long duct between the mixer and the propulsion nozzle. More realistic figures for mixing efficiency, bearing in mind the restricted length of duct available for mixing in a turbofan, are 50% to 70% approximately. It is important to note that even small improvements in the mixing efficiency can significantly improve the propulsive efficiency of a mixed flow turbofan, allowing lower specific fuel consumption, or alternatively giving increased propulsive thrust at the propulsion nozzle.

Conventional types of multilobed mixers have achieved high levels of mixing efficiency. Unfortunately, their overall performance is diminished by the fact that the mixer lobes cause a high degree of cross-stream turning in the flow of the bypass and turbine exhaust streams past the lobes, and are also responsible for a large amount of blockage to the two streams; these two factors produce high pressure losses in the streams, which show as thrust losses at the propulsion nozzle.

In copending U.S. Patent Application Ser. No. 646,048 and U.S. Pat. No. 4,487,017, the present applicants have proposed designs for novel types of multilobed mixers which establish a trailing vortex system for encouraging mixing between the two streams downstream of the mixer, the lobes, and the troughs between the lobes, comprising pairs of twisted flow surfaces, one side of each lobe or trough comprising a flow surface having a longitudinal clockwise twist between its upstream and downstream ends, and the other side of each lobe or trough comprising a flow surface having a similar but anticlockwise twist. The latter patent application proposed, as an advantageous inventive step over the disclosure of the former, to improve the aerodynamic characteristics of the lobes and troughs by shaping the flow surfaces such that, transverse of the longitudinal (streamwise) direction, their latitudinal contours at a succession of stations intermediate their upstream and downstream ends are sinuous shapes each with a single inflection.

The applicants have found that two major processes contribute to the mixing efficiency of the multilobed mixer types mentioned in the preceding paragraph; namely, the shear between the two streams, and the entrainment of the two streams in the vortices which trail from the downstream edges of the twisted flow surfaces. We have found that by modifying the design of these mixers, a third process can be caused to make a further substantial contribution to mixing efficiency.

Accordingly, the present invention provides an exhaust mixer of the multi-lobed type for a bypass gas turbine aeroengine whereby during operation of the aeroengine there is established a vortex system downstream of the exhaust mixer to encourage mixing between the bypass air stream and the turbine exhaust stream, the mixer having troughs between the lobes and the troughs and lobes comprising confronting pairs of flow surfaces which have progressive twist between their upstream and downstream ends such that said vortex system is established, said vortex system comprising vortices of bypass air and turbine exhaust trailing from the downstream edges of the flow surfaces and said mixer having vortex destabilising means whereby the vortices interact with each other and are caused to burst.

Such bursting of the vortices downstream of the twisted flow surfaces, particular if it is rapid, produces high levels of turbulence within the mixing duct, and hence increases mixing efficiency.

More specifically, vortex destabilisation is achieved by making the downstream edges of the twisted flow surfaces in the form of sinuous curves, each with a single point of inflection. This feature is not found in the prior patent applications mentioned above, where the downstream edges were straight lines, or curved in one sense only.

In more detail, the exhaust mixer can be described as having turbine-exhaust-stream-contacting flow surfaces which at least partially define the lobes, and bypass-air-stream-contacting flow surfaces which at least partially define troughs between the lobes, the flow surfaces having longitudinal progressive twist between their upstream and downstream ends such that confronting sides of each lobe and each trough comprise flow surface portions having opposed senses of twist, the latitudinal contours of the flow surfaces being adapted to give said flow surfaces sinuous downstream edges having a single point of inflection.

Preferably, the latitudinal contours of the flow surfaces change gradually in the downstream direction from uninflected curves extending peripherally of the turbine exhaust stream at the upstream ends of the flow surfaces, to the sinuous curves at the downstream edges of the flow surfaces, the overall orientation of the sinuous curves being transverse of said uninflected curves by reason of the twist in the flow surfaces. Thus, confronting sides of each lobe and each trough are delineated by mid-portions of the sinuous curves, outer portions of the lobes are at least partly delineated by outwardly convex portions of the sinuous curves, and inner portions of the troughs are at least partly delineated by inwardly concave portions of the sinuous curves.

Preferably, destabilisation of the vortices is further encouraged in that the twisted flow surfaces have a large angle of twist between their upstream and downstream ends, e.g. not less than 90° for the maximum angle of twist at their downstream ends as measured with respect to the mean orientations of their upstream ends.

Preferably the progressive twist between the upstream and downstream ends of the flow surfaces is non-uniform in that the the degree of twist per unit length of the flow surfaces is greater at their downstream ends than at their upstream ends.

Optionally, peripherally adjacent flow surfaces are not contiguous with each other over at least their downstream portions, whereby the outer portions of the lobes and/or the inner portions of the troughs are provided with substantially V-shaped gashes therein, said gashes extending convergently upstream from the downstream ends of the lobes and troughs.

The downstream ends of the flow surface portions comprising the inner portions of the troughs may be further downstream than the downstream ends of the flow surface portions comprising the outer portions of the lobes, or vice-versa.

Embodiments of the invention will now be described by way of example only with reference to the accompanying drawings in which:

FIG. 1 shows a part-sectional side view of the rear part of a turbofan aeroengine fitted with an exhaust stream mixer as disclosed in U.S. Pat. No. 4,487,017;

Figure 1:
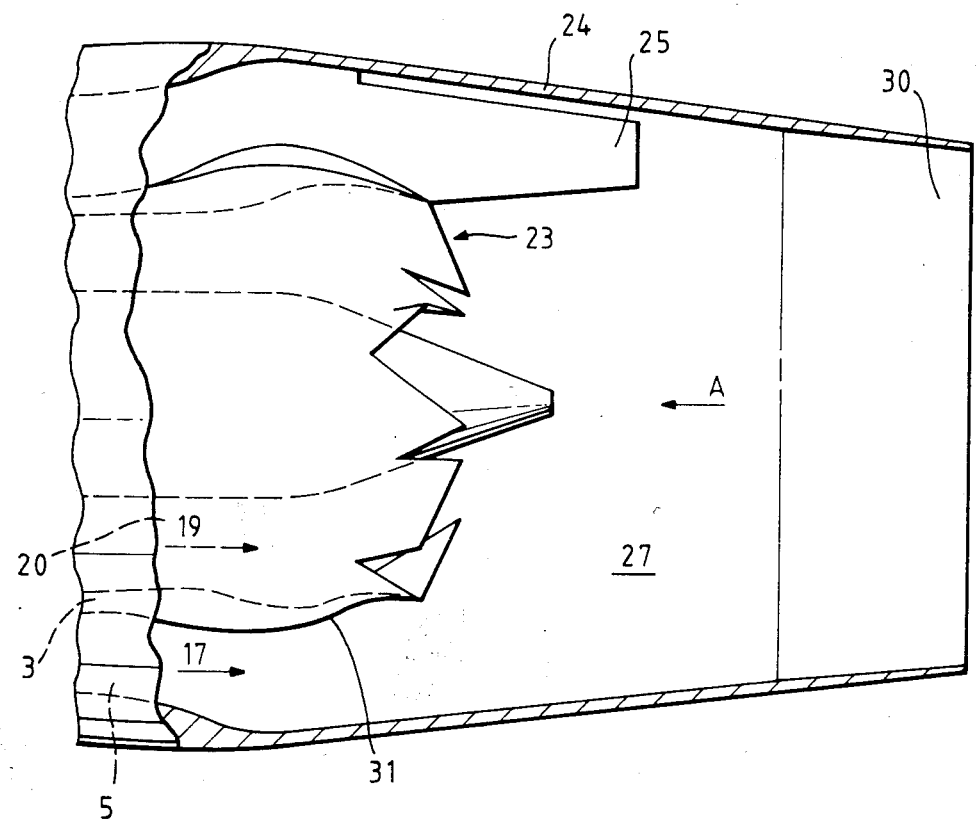
Figure 2:
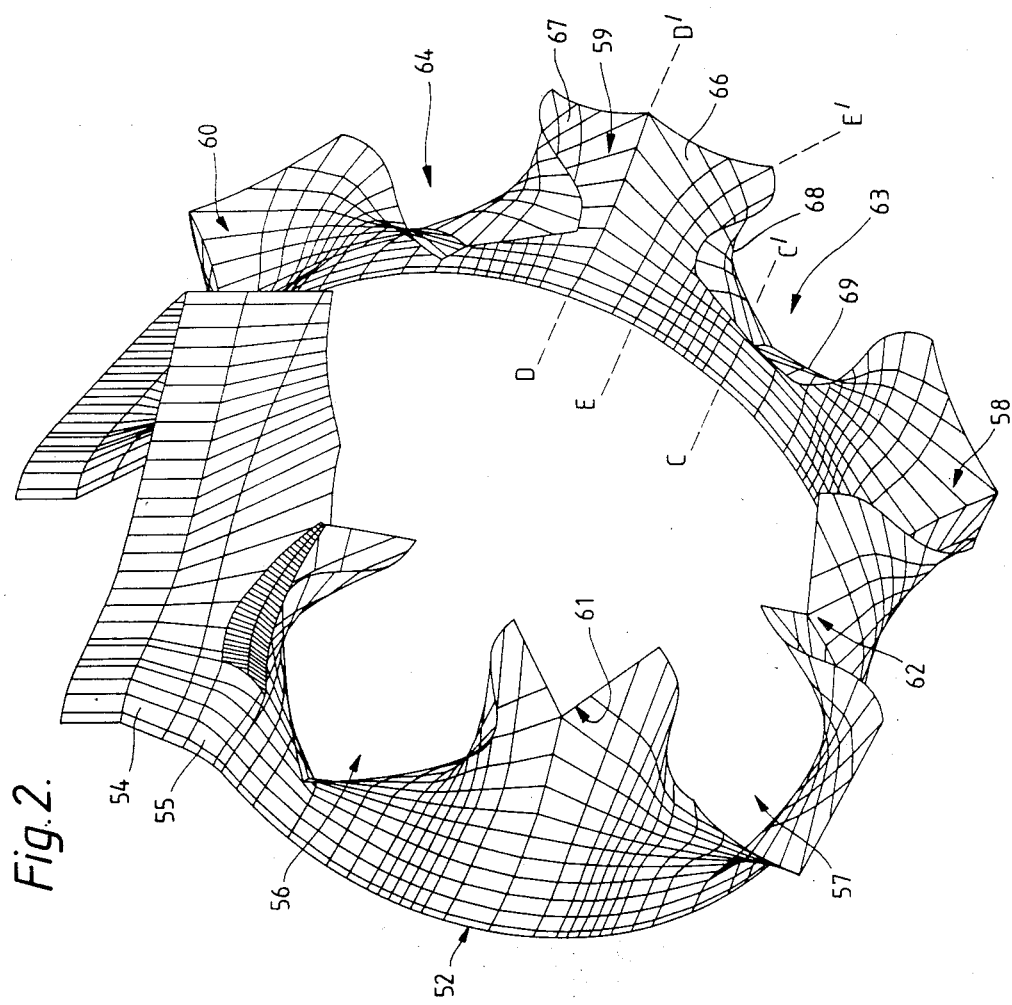
FIG. 2 is a computer-generated perspective view of a five-lobed exhaust stream mixer embodying the present invention.

Referring first to FIGS. 1 and 2, a turbofan aeroengine has an exhaust stream mixer 23 composed of twisted flow surfaces as disclosed in our prior U.S. Pat. No. 4,487,017. Mixer 23 receives the bypass air stream 17 from bypass duct 5 and the turbine exhaust stream 19 from turbine exhaust duct 20 and initiates the mixing process, which continues downstream in mixing duct 27 before exit of the combined streams through plain conical propulsion nozle 30, which is defined by the downstream end of engine nacelle 24.

The turbofan is supported from the underside of an aircraft wing (not shown) by means of suspension linkages connecting the engine core 3 to a pylon (not shown) on the wing, the linkages being within a fairing 25 which occupies the top sector of bypass duct 5.

Figure 3:
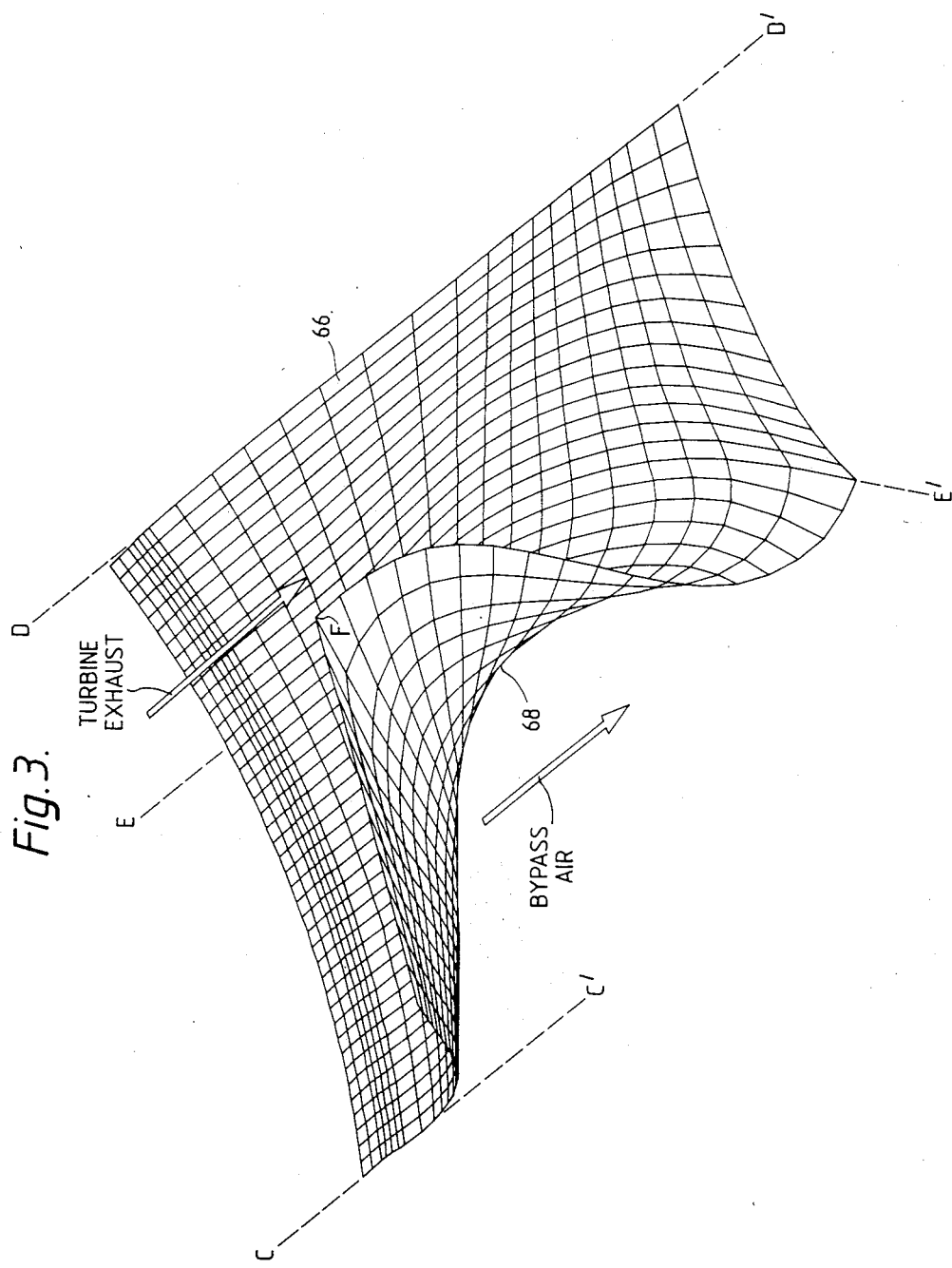
FIG. 3 is a computer-generated enlarged view of the part of the mixer between the lines C—C′ and D—D′ in FIG. 2.

Referring now to FIGS. 2 and 3, the shape of a mixer according to the present invention is shown as a network of contour lines which appear as if a cylindrical network of lines of longitude and latitude has been distorted by stretching the cylinder to the shape of the mixer. In FIG. 2, a complete mixer-body 52 is shown, together with the aft portion of a suspension fairing 54 with which it cooperates. Other structure of the aeroengine in which mixer 52 is incorporated has been omitted for the sake of clarity, but it would be located in the aeroengine similarly to mixer 23 in FIG. 1.

The view in FIG. 2 shows that mixer-body 52 has five lobes 56–60, with four inervening troughs 61–64. In addition, fairing 54 is interposed between the two top lobes 56 and 60; the fairing is tapered rearwardly and its flanks are shaped so that in conjunction with the adjacent flanks of lobes 56 and 60, bypass air is projected underneath the fairing to mix with the turbine exhaust stream. Fairing 54 is blended into the mixer body 52 by means of fillet 55.

For the purposes of the present description, a complete "lobe" is defined as extending from the mid-point of the trough between two lobes to the next angularly adjacent mid-point, the angular extend of a "half-lobe" therefore being exemplified by the sector of the mixer extending between lines C—C′ and D—D′. The two half-lobes adjacent to this exemplary half-lobe are mirror images about lines C—C′ and D—D′ respectively.

As in the U.S. Pat. No. 4,487,017, the lobes and troughs are formed from confronting pairs of twisted flow surfaces. For example, lobe 59 is defined by the turbine-exhaust-stream-contacting flow surfaces 66 and 67, which are mirror-images of each other on either side of line D—D′, and trough 63 is defined by the bypass-stream-contacting flow surfaces 68 and 69, which are mirror-images about line C—C′. The two flow surfaces 66 and 68 are of course the inner and outer surfaces respectively of the half lobe within lines C—C′ and D—D′.

As will be seen clearly in FIG. 3, both of the flow surfaces 66 and 68 have latitudinal contours which exhibit a gradual longitudinal (axial or streamwise) transition from a circular arc CED at their forward end, to a sinuous, somewhat S-shaped, curve in their midregions, to a compound curve FE′D′ at their trailing edge which includes an S-shaped portion FE′. Longitudinal contour line E—E′ conveniently divides the flow surfaces 66 and 68 into two regions C—C′ to E—E′ and E—E′ to D—D′, E′ marking a cusp point in the three-dimensional curvature of the trailing edge and E being the projection of E′ into the undistorted circular arc CD.

In the present invention, therefore, the reflexing latitudinal contours which start to develop a short distance downstream of CED are continued and further developed right through to the trailing edge of the flow surfaces; this contrasts with the invention of the above-mentioned U.S. Pat. No. 4,487,017 in which the reflexing contours are most pronounced at a cerain longitudinally intermediate position and then cease at more downstream stations so that the trailing edges are curved in one sense only or are straight lines.

By reason of the transition from a circular arc CED at the forward end to a compound curve FE′D′ at the trailing edge, which curve overall is oriented transversely of arc CED, the surfaces 66 and 68 have an overall clockwise twist between their upstream and downstream ends. However, the reflexing latitudinal contours, carried through to the trailing edge, produce considerable latitudinal variation in the degree of twist of the trailing edge relative to arc CED, with the result that bypass air and turbine exhaust coming over arc CED reach the trailing edge FE′D′ having been given a large range of clockwise rotational velocity components due to the varying degrees of clockwise twist in the intervening flow surfaces 66 and 68. Not only this, but the S-shaped contours of the flow surfaces in the region between lines C—C′ and E—E′ produce a large range of radial velocity components in the bypass air and turbine exhaust as they pass trailing edge portion FE′, these radial velocity components varying from radially inward directed components at or near F to radially outward components at or near E′. In the region between lines E—E′ and D—D′, the bypass air and turbine exhaust are given only radially outward components of velocity because of the radially outward flare of their flow surfaces in this region, the range of radial velocity components as they pass trailing edge portion E′D′ being relatively small because of the absence in this region of reflexing latitudinal curves.

Downstream of the trailing edge FE′D′ there is formed a twin helical vortex system comprising portions of the bypass air and turbine exhaust streams which have been given clockwise rotational momentum by the twisted flow surfaces 66 and 68. However, the vortex system is highly unstable because of the angular and radial velocity component variations mentioned above, which cause the twin helical vortices to interact with each other and burst rapidly. This leads to highly turbulent conditions downstream of the trailing edge, with a consequent highly effective mixing action between the two streams.

Though in U.S. Pat. No. 4,487,017, assigned to the common assignee herein, it was thought desirable to keep trailing edges of the twisted flow surfaces straight, or curved in one sense only, in order to minimise their length and hence minimise drag, we now believe that the better mixing induced by the S-shaped trailing edges more than compensates for any extra drag they create. We also believe that early dissipation of the trailing vortex core energy in the mixing duct due to a rapid vortex bursting process need not introduce any significant additional pressure loss compared with non-bursting or slow-bursting vortex systems; this is because pressure losses in this type of mixer are caused mostly by the initial establishment of the vortex system and the degree to which the flow surfaces obstruct the outlet of the bypass duct.

Since it is well known that any net rotational motion in the combined exhaust stream as it flows through the propulsion nozzle represents a thrust loss, we point out that because in the mixer 52 adjacent half-lobes are mirror-images of each other, this results in the net helical motion in the combined exhaust stream being substantially zero (assuming no net helical motion in the streams before they encounter the mixer).

It will of course be realised from an inspection of FIGS. 2 and 3 that the lobes and troughs of the mixer are produced as a result of the twist in the flow surfaces and their reflexing latitudinal contours. Thus, in FIG. 3, the S-shaped contours have: outwardly convex portions which, together with the region of flow surface 66 between lines E—E' and D—D', aid in delineating the outer portion of lobe 59; inwardly concave portions which partly delineate inner portions of the trough 63; and intermediate portions which serve to delineate the common side-wall of lobe 59 and trough 63.

The bottom of trough 63 is only partly defined by the radially inner parts of the S-shaped latitudinal contours of flow surface 68 and their mirror-images on the other side of line C—C'. This is caused by one of the deep V-shaped gashes apparent in the perimeter of the mixer in FIG. 2, where peripherally adjacent flow surfaces of opposite twists are not contiguous with each other. These gashes are caused by choosing to make the edge portions, such as CF in FIG. 3, to be straight lines over the major portion of their length in order that they should be as short as possible given the desired radial and axial positions of point F with respect to the centreline of the mixerbody: this minimises aerodynamic losses, but more importantly the V-shaped gashes assist progressive contact and mixing between portions of the bypass air and turbine exhaust before the two streams have passed the rear end of the mixerbody.

It should also be noted that the trailing edge of FE'D' of the flow surfaces is scarfed, i.e. point F is further rearward than point E' which is further rearward than point D'. (This is best seen in connection with lobe 56 and trough 61 on the opposite side of the mixer in FIG. 2). Combined on the fact that point F is the radially innermost point on the trailing edge by virtue of the clockwise twist in the flow surfaces 66 and 68, this gives good penetration of the bypass air into the turbine exhaust stream, whilst keeping the mixer axially short. It would also be possible to scarf in the reverse direction i.e. the downstream ends of the flow surface portions comprising the inner portions of the troughs could be further upstream than the downstream ends of the flow surface portions comprising the outer portions of the lobes.

Although the embodiment described in connection with FIGS. 2 and 3 has five lobes 56 to 60, the actual number of lobes chosen is at the discretion of the designer. Whilst a large number of lobes will probably result in a more effective mixing process, this gain has to be balanced against the greater drag which also results.

Figure 4:
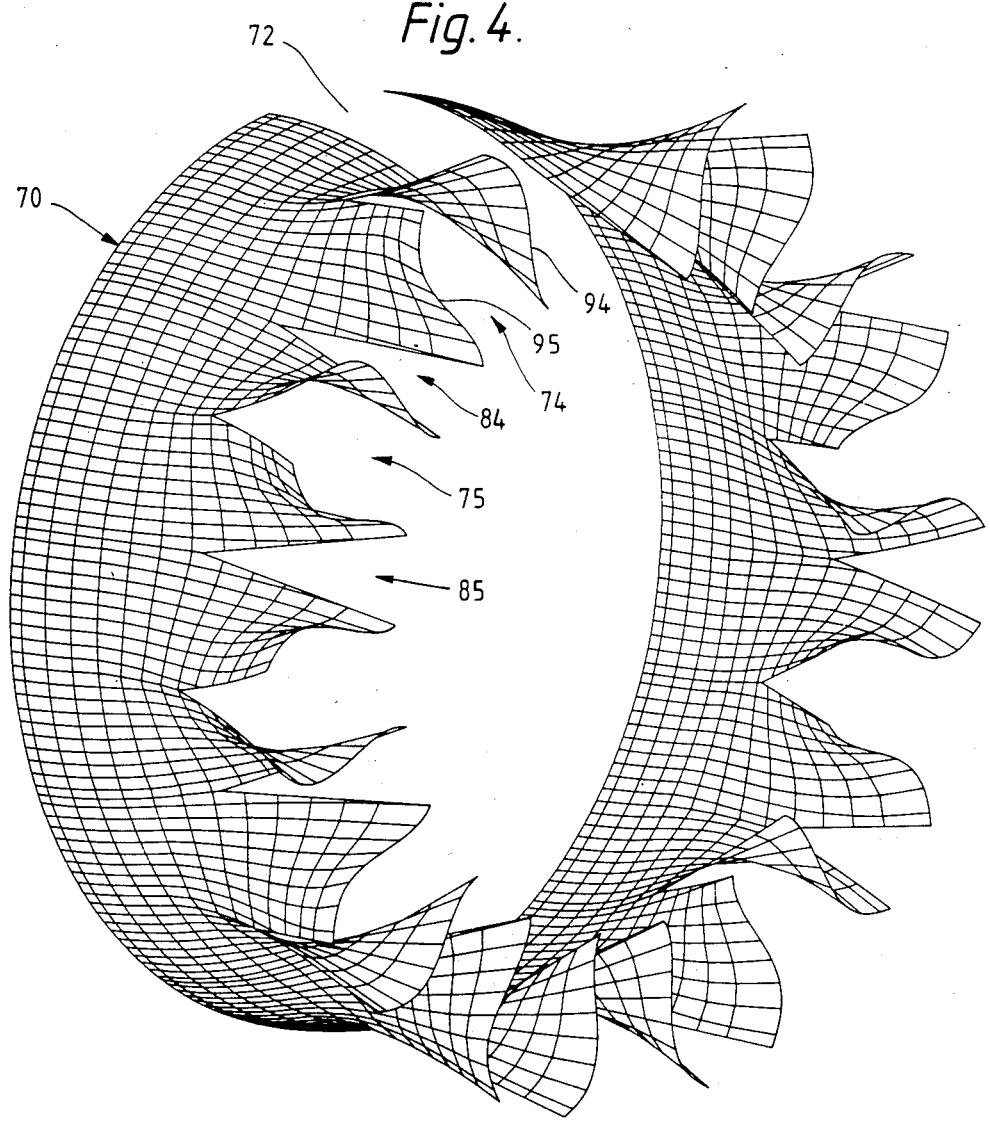
FIG. 4 is a computer-generated perspective view of a further embodiment of the invention.

As an example, FIG. 4 shows a 9/10 lobed mixer 70 based on the same S-shaped trailing edge concepts as the one illustrated in FIG. 2, but having the following differences (note the gap 72 in the circumference of the mixer body 70 where the suspension fairing, if shown, would take the place of the tenth lobe):

(a) Deep V-shaped gashes are apparent in tops of the lobes such as 74,75 etc., as well as the bottoms of the troughs such as 84,85 etc. to assist progressive contact between the bypass air stream and the turbine exhaust stream, adjacent twisted flow surfaces being non-contiguous over most of their length;

(b) The flow surface trailing edges such as 94,95 etc. are not scarfed, but coplanar, i.e. the trailing edges are all situated in the same radial plane.

It will now be apparent that a reflexing trailing edge for the twisted flow surfaces may be combined with a number of other features, such as: the amount of scarfing of the traling edges; the extent to which the contours (longitudinal as well as latitudinal) of the flow surfaces, in conjunction with the amount of scarfing, aid interpenetration of the two streams by their flow-turning effects; the number of lobes defined by the flow surfaces; and the degree to which adjacent flow surfaces are made contiguous with each other at the tops of the lobes and the bottoms of the troughs. The basic concept, however, is to optimise mixer efficiency by promoting rapid vortex bursting downstream of the trailing edges, and in this connection a high degree of twist (upwards of 45°) in the flow-surfaces is desirable—in FIGS. 2 and 3 it reaches more than 90° in the middle of the trailing edge portion FE'. The degree of twist per unit length of flow surfaces is preferably greater at the downstream end than at the upstream end.

Although in FIGS. 3, 4 and 5, the mixer-bodies are shown merely as a network of longitudinal and latitudinal contour lines of negligible thickness for simplicity of the computer software involved in producing the drawings, it will be appreciated that the inner and outer flow surfaces 66,68 would preferably be two sheet metal skins joined directly together at their common trailing edges but which would be otherwise spaced apart from each other by, e.g. a honeycomb core structure of varying thickness according to the part of the mixer being considered, the object being to produce a light, strong, flexurally stiff structure as also described in the above-mentioned copending patent application.

I claim:

1. An exhaust mixer of the multi-lobed type for a bypass gas turbine aeroengine whereby during operation of said aeroengine there is established a vortex system downstream of said exhaust mixer to encourage mixing between a bypass airstream and a turbine exhaust stream, said mixer comprising:

a plurality of troughs and lobes, said troughs being located between said lobes, said troughs and said lobes comprising confronting pairs of flow surfaces, said flow surfaces having a progressive twist between their upstream and downstream ends such that said vortex system is established, said vortex system including vortices of said bypass air and said turbine exhaust trailing from said downstream ends of said flow surfaces, and vortex destabilising means including said twisted flow surfaces having downstream edges in the form of sinuous curves each having a single point of inflection, said sinuous curves producing substantial variations in the degree of twist of the downstream ends of the flow surfaces relative to their upstream ends, said bypass airstream and said turbine exhaust stream leaving the downstream edges of said flow surfaces with a substantial range of rotational velocity components and a substantial range of velocity components transverse to the streamwise direction of air and exhaust flow whereby said vortex system is rendered unstable and said vortices interact with one another to burst.

2. An exhaust mixer according to claim 1 in which said vortex destabilising means comprises the downstream edges of the twisted flow surfaces, said downstream edges being in the form of sinuous curves each having a single point of inflection.

3. An exhaust mixer of the multi-lobed type for a bypass gas turbine aeroengine, said exhaust mixer having turbine-exhaust-stream-contacting flow surfaces which at least partially define said lobes, and bypass-airstream-contacting flow surfaces which at least partially define said troughs between said lobes, said flow surfaces having upstream and downstream ends and further having a longitudinal progressive twist between said upstream and downstream ends such that confronting sides of said lobe and each of said trough comprise flow surface portions having opposed senses of twist, latitudinal contours of said progressively twisted flow surfaces giving said flow surfaces sinuous downstream ends having a single point of inflection, said sinuous downstream ends producing substantial variations in the degree of twist of the downstream ends of the flow surfaces relative to their upstream ends, said bypass airstream and said turbine exhaust stream leaving the downstream ends of said flow surfaces with a substantial range of rotational velocity components and a substantial range of velocity components transverse to the streamwise direction of said bypass air and exhaust flow, said vortex system being thereby rendered unstable, said vortices interacting with one another to burst.

4. An exhaust mixer according to claim 3 in which said latitudinal contours of said flow surfaces change gradually in the downstream direction from uninflected curves extending peripherally of said turbine exhaust stream at said upstream ends of said flow surfaces, to said sinuous curves at said downstream edges of said flow surfaces, the overall orientation of said sinuous curves being transverse of said uninflected curves by reason of said twist in said flow surfaces, whereby confronting sides of each of said lobes and each of said troughs being delineated by mid-portions of said sinuous curves, outer portions of said lobes are at least partly delineated by outwardly convex portions of said sinuous curves, and inner portions of said troughs are at least partly delineated by inwardly concave portions of said sinuous curves.

5. An exhaust mixer according to claim 1 or claim 3 in which said progressive twist between said upstream and said downstream ends of said flow surfaces is non-uniform in that the degree of twist per unit length of said flow surfaces is greater at said downstream ends that at said upstream ends.

6. An exhaust mixer according to claim 1 or claim 3 in which said flow surfaces have a maximum angle of twist between their upstream and downstream ends of not less than 90°.

7. An exhaust mixer according to claim 4 in which peripherally adjacent flow surfaces are not contiguous with each other over at least their downstream portions, whereby said outer portions of said lobes and/or said inner portions of said troughs are provided with substantially V-shaped gashes therein, said gashes extending convergently upstream from said downstream ends of said lobes and troughs.

8. An exhaust mixer according to claim 4 in which said downstream ends of said flow surface portions comprising said inner portions of said troughs are further downstream than said downstream ends of said flow surface portions comprising said outer portions of said lobes.

* * * * *